United States Patent [19]

Inskip et al.

[11] 4,418,270
[45] Nov. 29, 1983

[54] ELECTRIC LIQUID HEATING APPLIANCE

[75] Inventors: Michael Inskip, Stoke-on-Trent; Alan Warren, Western Downs, both of England

[73] Assignee: TI Russell Hobbs Limited, England

[21] Appl. No.: 274,266

[22] Filed: Jun. 16, 1981

[30] Foreign Application Priority Data

Jun. 18, 1980 [GB] United Kingdom ............... 8019847

[51] Int. Cl.³ .................. H05B 3/80; A47J 31/56; A47J 27/21
[52] U.S. Cl. .................................. 219/328; 219/441; 219/437; 219/438; 219/331
[58] Field of Search ............... 219/328, 331, 437, 441, 219/442, 436, 438

[56] References Cited

FOREIGN PATENT DOCUMENTS

| 892685 | 3/1962 | United Kingdom | 219/437 |
| 1296279 | 11/1972 | United Kingdom | 219/437 |
| 1408389 | 10/1975 | United Kingdom | 219/437 |
| 1470367 | 4/1977 | United Kingdom | 219/437 |
| 2056828 | 3/1981 | United Kingdom | 219/328 |

Primary Examiner—B. A. Reynolds
Assistant Examiner—Teresa J. Walberg
Attorney, Agent, or Firm—Leydig, Voit, Osann, Mayer and Holt, Ltd.

[57] ABSTRACT

The appliance, e.g. an electric kettle, has a body shell, a heating element within the body shell and a switch housing mounted on the outside of the body shell. A switch operating member or dolly is supported relative to the switch housing and is operable to open and close a pair of switching contacts for interrupting and making respectively an electrically conductive path, which includes the heating element, between a pair of terminal pins. The dolly can rock about a pivot between two positions and is urged against the pivot by a leaf spring acting between the dolly and a support. The housing includes the pivot and the support and is formed as an integral plastics moulding.

4 Claims, 2 Drawing Figures

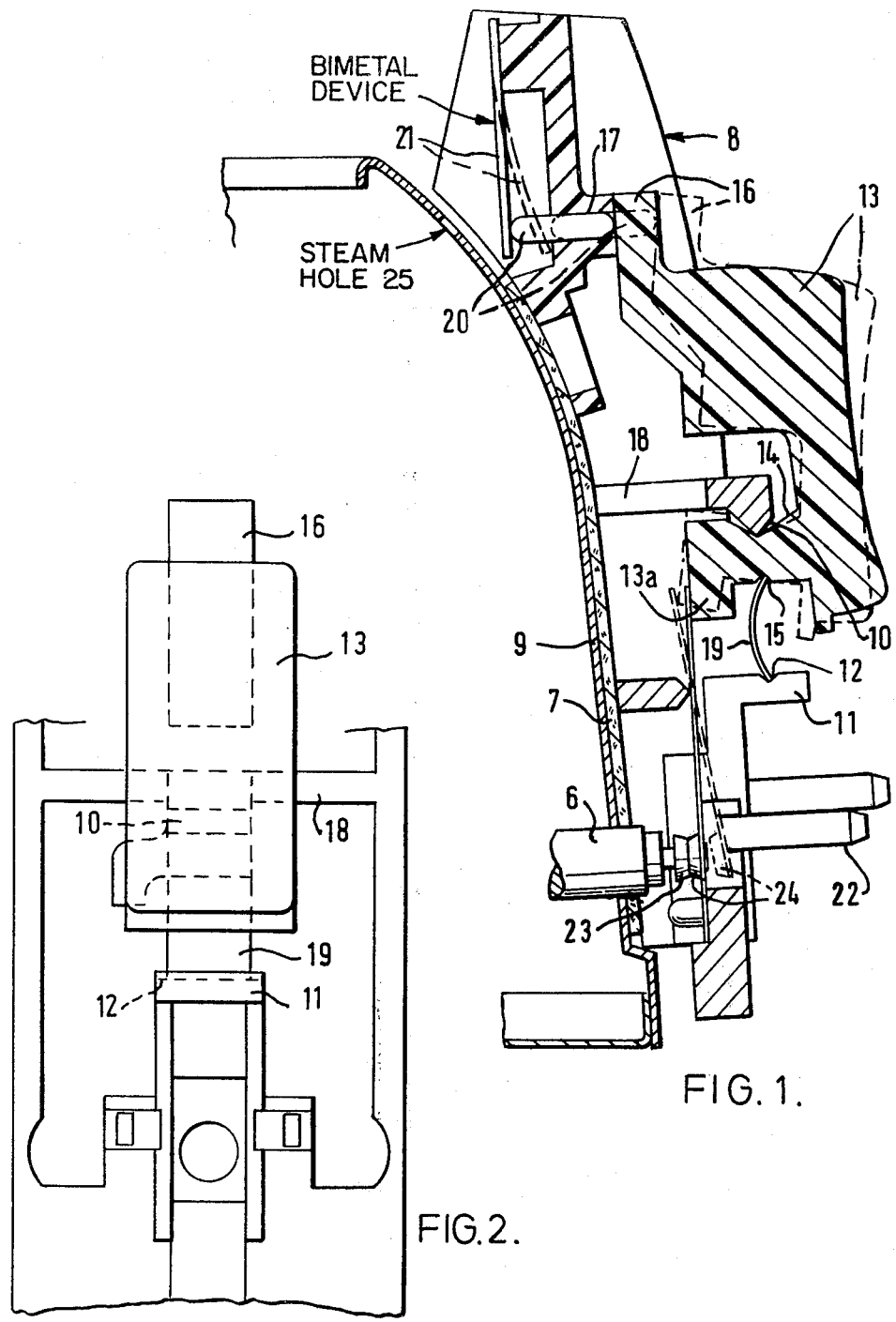

ELECTRIC LIQUID HEATING APPLIANCE

This invention relates to an electric liquid heating appliance, and particularly but not exclusively relates to an electric kettle.

According to the present invention, there is provided an electric liquid heating appliance comprising a body shell, a heating element within the body shell and having two ends which project through the body shell, a switch housing mounted on the outside of the body shell, a switch operating member supported relative to the switch housing and operable to open and close a pair of switching contacts for interrupting and making respectively an electrically conductive path, which includes the heating element, between a pair of terminal pins, and a pivot about which the switch operating member can rock between first and second positions and against which the switch operating member is urged by spring means acting between the switch operating member and a support, wherein the housing includes the pivot and the support and is formed as an integral plastics moulding.

Preferably, the spring means is a leaf spring seated at one end in a groove or recess in the switch operating member and seated at an opposite end in a groove or recess in the support.

Advantageously, the grooves or recesses are of V-shaped cross-section and one groove or recess is generally inverted relative to the other.

The invention will now be more particularly described with reference to the accompanying drawings wherein:

FIG. 1 is a sectional view of one embodiment of a switch housing of an electric appliance according to the invention, and FIG. 2 is a right hand end view of part of the switch housing of FIG. 1 with switch gear removed for clarity.

Referring to the drawings, there is shown therein a switch housing 8 which is mounted on the outside of a body shell 9 of an electric kettle with a gasket 7 disposed between the housing 8 and body shell 9. The kettle is provided with a heating element 6 within the body shell and having two ends which project through the body shell.

The switch housing 8 is formd as an integral plastics moulding preferably an integral thermosetting plastics moulding. A portion of the integral plastics moulding defines an elongate pivot 10 of V-shaped cross-section. The integral plastics moulding also includes a support 11 having an elongate V-shaped groove (or recess) 12.

A switch assembly includes a dolly (switch operating member) 13 which can rock between a first position— shown in full lines in FIG. 1 and a second position shown in broken lines in FIG. 1. The dolly 13 includes an integral arm 13a which has a V-shaped groove (or recess) 14 in its upper surface and an inverted V-shaped groove (or recess) 15 in its lower surface. The included angle of the V-shaped groove 14 is greater than the included angle of the V-shaped cross-section of the pivot 10 so that the dolly 13 can rock between its first position in which an arm 16 thereof contacts an end of a tubular guide 17 formed as an integral part of the switch housing and its second position in which the free end of arm 13a contacts a cross-member 18 which is also formed as an integral part of the switch housing.

The V-shaped groove 12 and inverted V-shaped groove 15 have much smaller cross-sectional dimensions than the groove 14 and act as seats for opposite ends respectively of a bowed leaf spring 19. The spring 19 urges the arm 13a against the pivot 10 and acts as an "over centre" spring to maintain the dolly 13 in a selected first or second position until acted upon by other means.

The switch housing also includes locations for two terminal pins 22 interconnected by an electrically conductive path which includes the heating element of the kettle and a pair of switching contacts 23 and 24 relatively movable by the dolly 13 between an open position interrupting the conductive path and a closed position making the conductive path.

The tubular guide 17 slidably supports a push rod 20 which is movable by a bimetal device 21 supported by the housing. When the water in the kettle boils, the bimetal device 21 is subjected to steam through the steam hole 25 and resultant distortion of the device 21 moves the push rod 20 which in turn pushes the dolly 13. Once the dolly goes "over centre" the action of the leaf spring continues to move the dolly to its second position during which movement the contacts open.

Also, the kettle may be provided with a temperature protective device comprising a further bimetal device (not shown) which is supported by the switch housing and is responsive to the temperature of the heat transmission surfaces of the heating element to rock the dolly 13 to its second position in a situation in which there is insufficient water in the kettle to cover the heating element when the heating element is energised.

Instead of the leaf spring 19 a coiled compression spring could be used. The compression spring could be provided with end caps having apertures for receiving spring locating lugs formed integrally with the support 11 and arm 13a respectively. The lugs would then of course, replace the grooves 12 and 15.

Any variation in the distance travelled by the dolly to reach the "over centre" position has a distinct effect upon the performance of the kettle, namely if the distance is too small the kettle will switch off too quickly and if the distance is too large the kettle will boil for too long a period before switching off. Because of this, previous switch designs have had to have built into them considerable allowance for adjustment to compensate for manufacturing tolerances of all the component parts used. However, the above described switch housing overcomes the problems by making all the critical pivot points integral parts of the switch housing and by employing the fact that thermosetting plastics mouldings cn be produced to very fine tolerances thus ensuring that the important distance from the push rod guide 17 to the "over centre" position is maintained resulting in a more efficient kettle.

The invention is not limited to electric kettles and could be applied to other suitable electrical liquid heating appliances, such as tea makers, milk warmers, coffee percolators, and immersion heaters.

We claim:

1. An electric liquid heating appliance comprising a body shell, a heating element within the body shell and having two ends which project through the body shell, a switch housing mounted on the outside of the body shell, a switch operating member supported relative to the switch housing and operable to open and close a pair of switching contacts for interrupting and making respectively an electrically conductive path, which includes the heating element, between a pair of terminal pins, a pivot about which the switch operating member can rock between first and second positions and against which the switch operating member is urged by a spring means acting between the switch operating member and a support, and means on said switch housing providing said pivot and said support, said switch housing being formed as an integral plastics moulding to fix the relative locations of said pivot and said support.

2. The heating appliance of claim 1, wherein the spring means is seated at one end in a recess in the switch operating member and seated at an opposite end in a recess in the support.

3. The heating appliance of claim 2, wherein the recesses are of substantially V-shaped cross-section and one recess is generally inverted relative to the other.

4. The heating appliance of claim 1, wherein the spring means is a leaf spring.

* * * * *